Figure 6:
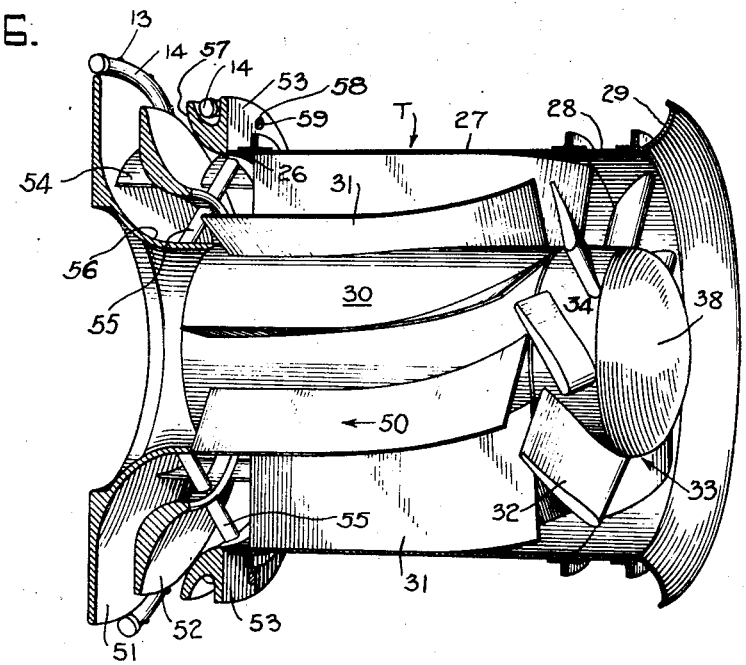

July 26, 1949.  G. W. DAUGHERTY  2,476,960
SPRAYING AND DUSTING MACHINE
Filed Jan. 9, 1946  4 Sheets-Sheet 1
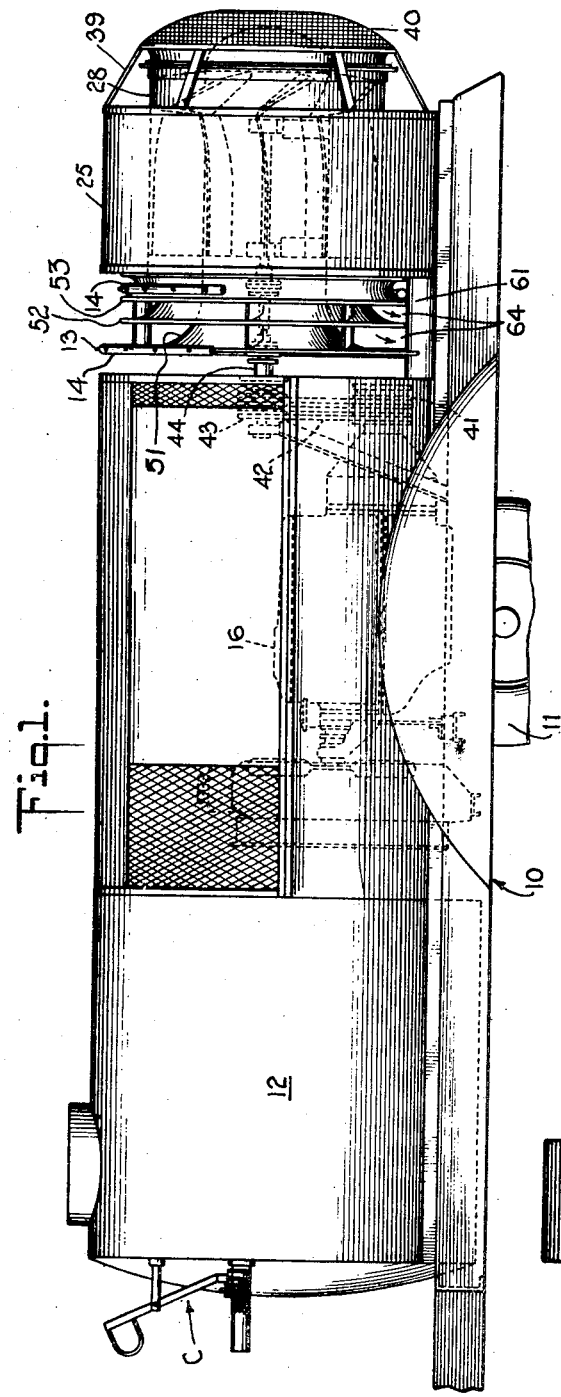
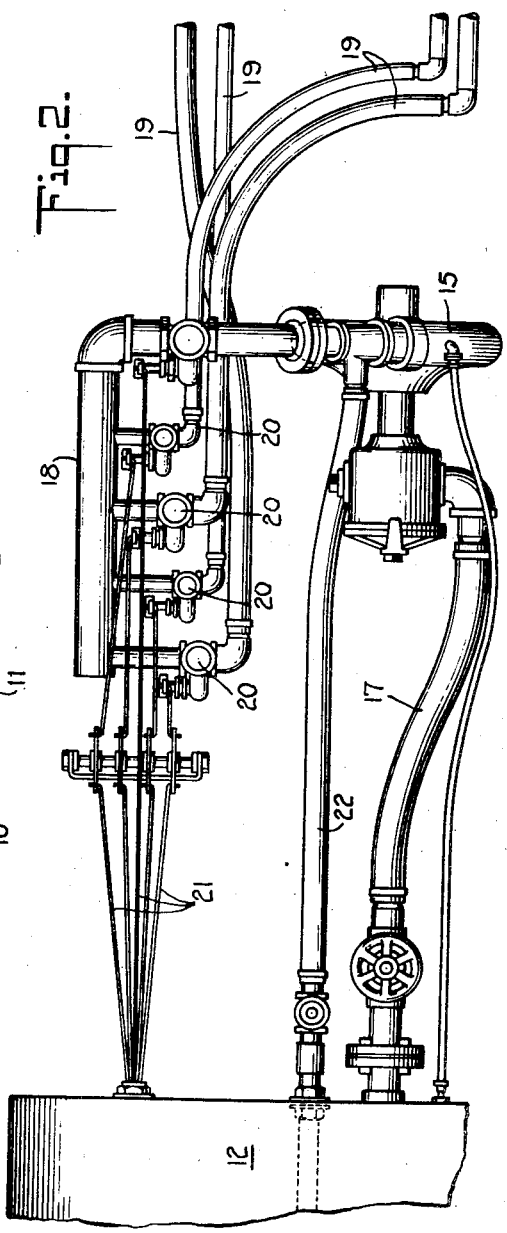
INVENTOR
G. W. Daugherty
BY
A. H. Golden
ATTORNEY

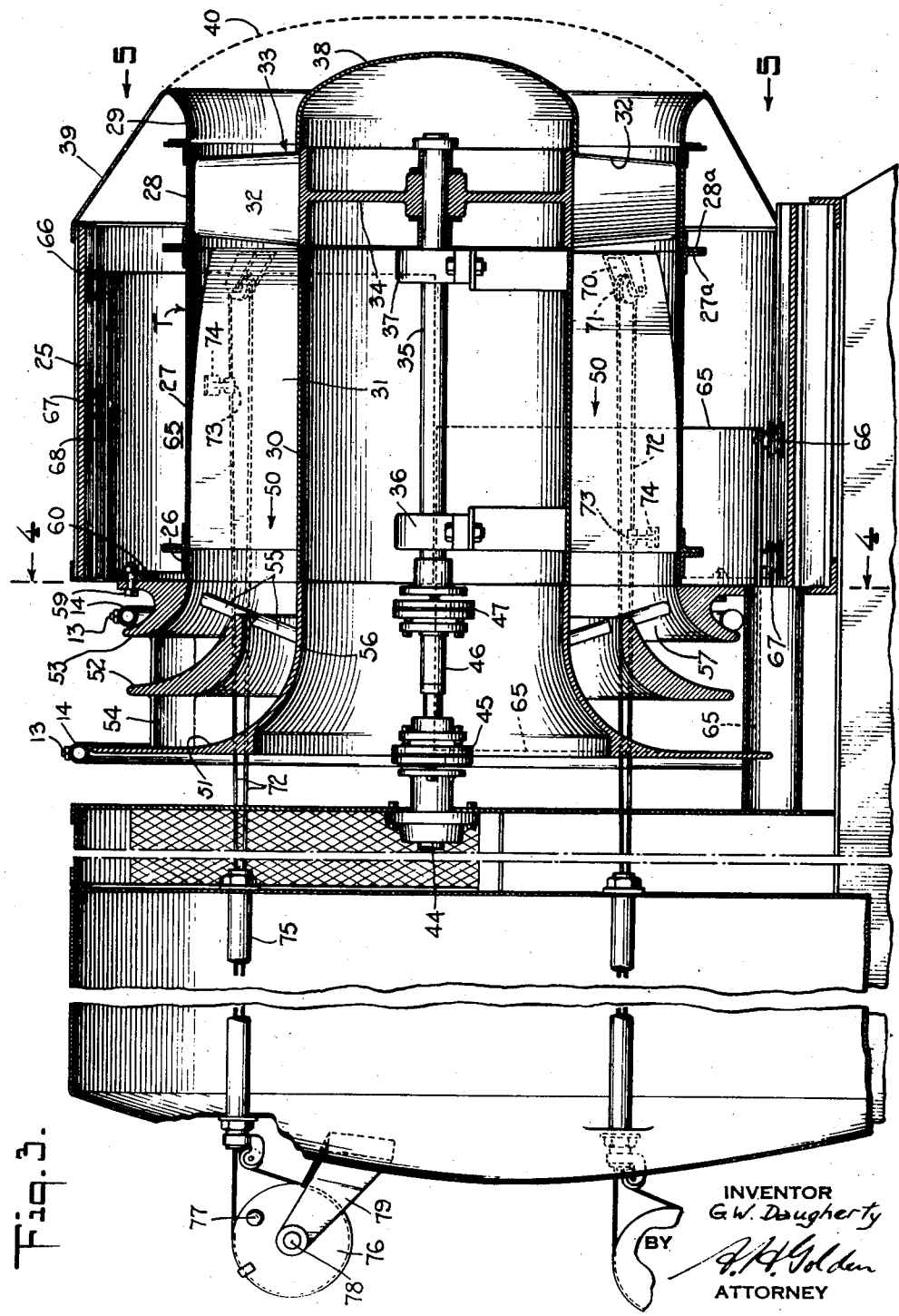

July 26, 1949.　　　G. W. DAUGHERTY　　　2,476,960
SPRAYING AND DUSTING MACHINE
Filed Jan. 9, 1946　　　　　　　　　　　　　4 Sheets-Sheet 3
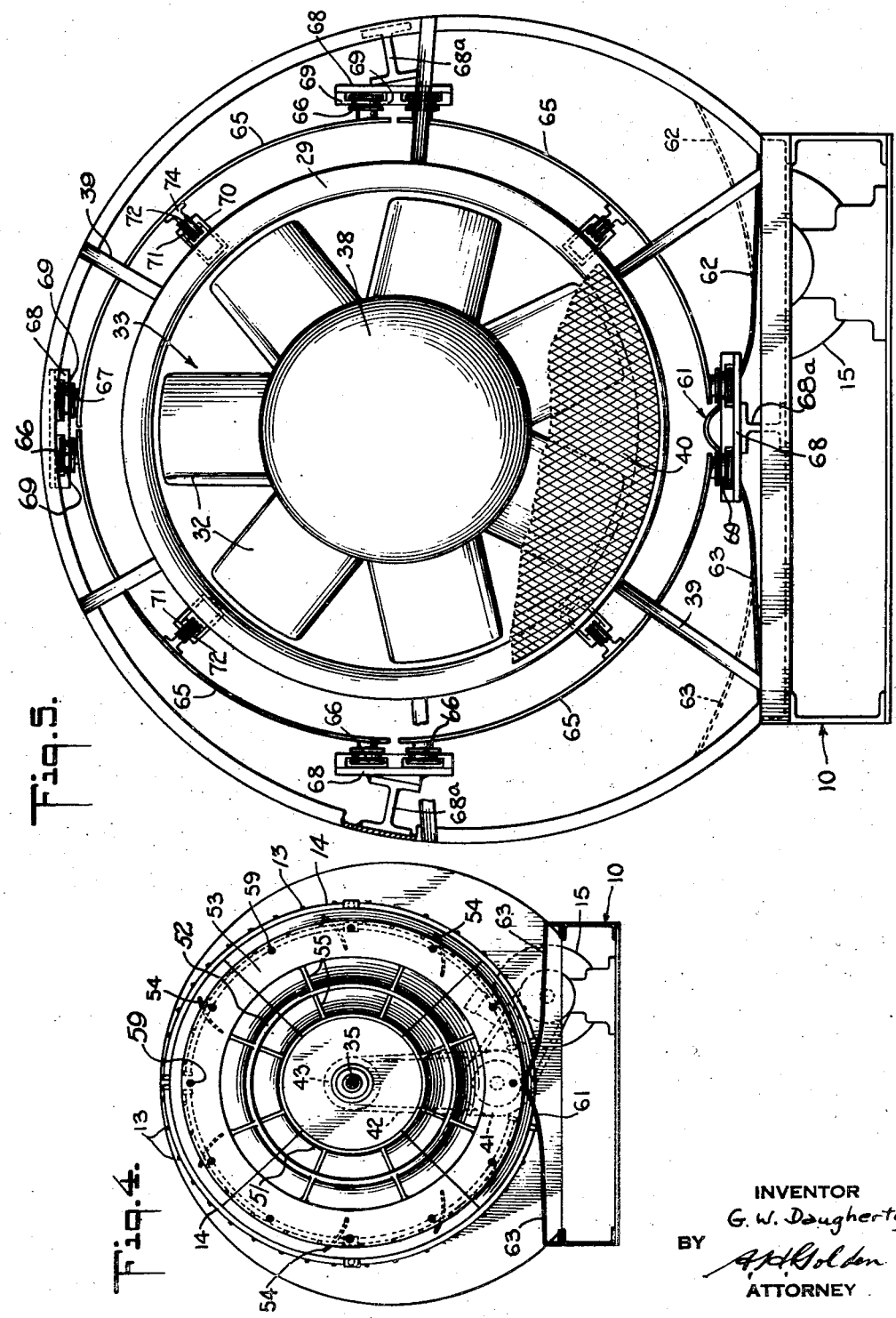
INVENTOR
G. W. Daugherty
BY
ATTORNEY July 26, 1949.  G. W. DAUGHERTY  2,476,960
SPRAYING AND DUSTING MACHINE
Filed Jan. 9, 1946  4 Sheets-Sheet 4

INVENTOR
G. W. Daugherty
BY
A. H. Golden
ATTORNEY

Patented July 26, 1949

2,476,960

UNITED STATES PATENT OFFICE 2,476,960

SPRAYING AND DUSTING MACHINE

George W. Daugherty, Orlando, Fla.

Application January 9, 1946, Serial No. 639,949

18 Claims. (Cl. 261—30)

1

This invention relates to a machine of the type disclosed in my earlier patents, Nos. 2,220,082 dated November 5, 1940, and 2,331,107 dated October 5, 1943.

Machines of the particular class require for effective operation a controlled distribution of a large volume of air, the air carrying with it spraying or dusting material to be deposited on the foliage. I have found that large volumes of air are best developed through means of a propeller type fan with the air moving through a long or relatively short tunnel, depending on conditions, and then directed toward the foliage. Spraying and dusting material may be supplied in several ways to the air blast that is generated by the propeller.

If reference is made to the machines disclosed in my earlier patents, it will be found that I take great pains to effect an even distribution of air, since it is only through such even distribution that I can control effectively the air, and direct it towards the foliage. I have found in my considerable work in this art that very little air is moved by the central portion of a propeller, and that therefore it is inherent that the air being generated by the propeller is unequal in intensity over the cross-sectional area subtended by the propeller. For the particular reason, I have conceived and constructed a machine in accordance with the teachings set forth in my patent application No. 545,975, filed July 21, 1944 (now Patent 2,475,449 dated July 5, 1949), wherein I utilize two series of propellers rotating on parallel shafts for generating a high volume of air that is well distributed over a large area.

It is the purpose of the invention to be disclosed in this application to contribute to the art a spraying or dusting machine that is extremely effective in the generation of a large volume of insecticide carrying air that may be subjected readily to deflection and other controls.

As a feature of my invention, I generate a ring of air, rather than a blast of air over a circular area as in my earlier machines. More particularly, this feature of my invention comprises the generation of a ring of air by the blades of a propeller with the ineffective portion of the propeller not utilized so that the resulting ring of air is relatively uniform in volume and is readily available for deflection in all directions.

As a more detailed feature of my invention I utilize a propeller that is rotated relatively to a tunnel for generating a blast of air through the tunnel with the center of the tunnel effectively shielded from the outer periphery of the tunnel so that the blast of air is confined between the outer periphery of the tunnel and a cylindrical shell that is used preferably for shielding the central portion of the tunnel. This results in the development of a ring of air.

As a still further feature of the invention, deflectors are placed at the end of the shell and tunnel for directing the ring of air radially and outwardly relatively to the tunnel.

As a still further feature of the invention the deflectors may be extensions of both the tunnel and the cylindrical shell surface so that the air will move smoothly from the tunnel and then radially outwardly toward the foliage to be sprayed or dusted.

A still further feature of the invention resides in the utilization of means for blocking the deflectors so that certain portions of the ring of air will not be able to flow immediately outwardly and radially, but will be compelled first to mingle into combination with other portions of the ring of air before moving outwardly and radially relatively to the tunnel.

I have thus outlined the general nature of my invention and its relation to the prior art in order that the description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized by those skilled in the art as the basis for the designing of other structures for carrying out the several purposes of my invention. It is important, therefore, that the claims to be granted me shall be of sufficient breadth to prevent such appropriation of my invention by those skilled in the art.

Figure 7:
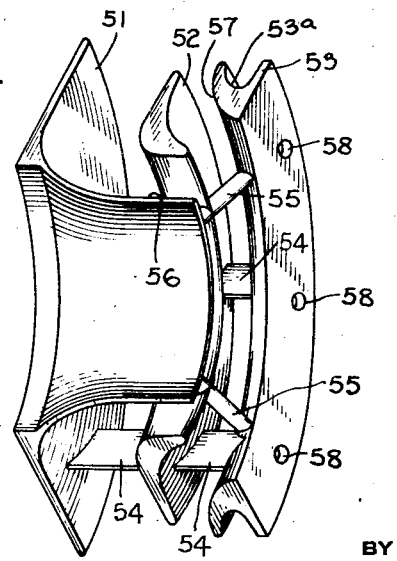

Referring now to the drawings, Fig. 1 is a general side elevation of a spraying machine embodying the construction of my invention. Fig. 2 is a view of the mechanism for supplying spraying material from the storage tank of my machine to the nozzles that feed the material into the air stream. At this point it will be well to indicate that while the invention is disclosed in connection with a spraying machine, it will function equally well in a dusting machine. Fig. 3 is a vertical section through the machine. Fig. 4 is a section taken along lines 4—4 of Fig. 3. Fig. 5 is a view looking at Fig. 3 in a direction of the arrows 5 of Fig. 3. Fig. 6 is a perspective and sectional view of the air tunnel, the propeller and the air deflectors. Fig. 7 is a perspective view of one of the deflector groups of my invention.

Referring now more particularly to the drawings, reference numeral 10 indicates a chassis mounted on wheels 11 and adapted to be pulled by a tractor or other vehicle as is well set forth in my several earlier patents. Mounted on the chassis is a tank 12 adapted to contain spraying material that is supplied to a series of spraying nozzles 13 inserted in metal tubes 14, the said metal tubes 14 being shaped to conform to the deflector system to be described hereinafter.

A pump 15 is suitably driven by an internal combustion engine 16 and is adapted to pump the fluid from a pipe 17 leading from the tank 12 into a manifold 18. It is from this manifold 18 that the fluid is pumped to a series of flexible hose 19 that lead to individual tubes 14 containing the nozzles 13. A series of valves 20 are actuated by a series of rods 21 for controlling the flow of fluid through the several pipes 19, it being frequently desirable that spraying material be supplied only to predetermined nozzles 13 rather than to all the nozzles. Provisions are made for hydraulically turbulating the fluid within the tank 12 by utilizing part of the capacity of the pump 15 flowing through a pipe 22. The flow of the spraying material is controlled at the front end of the machine by means designated generally by reference letter C. Since the supplying of the spraying material is in accordance with the teachings of my earlier inventions and is not herein claimed, I shall not describe in further detail the particular mechanism, it being thought that the description so far given is sufficient for a general understanding of the structure herein described.

The air tunnel of my invention utilizes a main outer casing 25 that supports through suitable structural members a series of circular sheet metal surfaces 26, 27, 28, and 29 that together comprise the tunnel T. As is best seen in Figs. 3 and 6, there is mounted within the tunnel T a cylindrical shell 30 that is supported relatively to tunnel T by a series of guide fins 31. These guide fins are preferably welded in position between the tunnel T and the cylindrical shell 30 and maintain the shell rigidly in place. The guide fins not only serve to support the shell 30 in position but also act to guide and straighten the air stream that is developed by the blades 32 of a propeller 33.

The propeller 33 comprises blades 32 extending from what I term a hub 34, the hub being in turn secured on a shaft 35. The shaft 35 is mounted on bearings 36 and 37 suitably supported within the shell 30. It will now be appreciated that the blades 32 are so formed that they are adapted to generate a blast of air in the space between the tunnel T and the cylindrical shell 30, the hub 34 of the propeller having no air moving function. Therefore, the propeller blades 32 will generate a ring of air rather than a circular area of air as in my earlier machines.

For aiding the blast of air to enter the ring-like area between the tunnel T and the cylindrical shell 30, the hub 34 of the propeller has secured thereto a sheet metal dome 38, and the circular surface 29 of the tunnel is formed bell shaped as will readily be noted from the drawings. A series of struts 39 extend between the outer casing 25 and the surface member 29 for reinforcing it as will be readily appreciated. For protecting and shielding the propeller a screen may be utilized and such a screen is shown by me in the drawing at 40.

For rotating the propeller shaft 35 a series of drive pulleys 41 are utilized, these pulleys being rotated by the internal combustion engine 16. Belts 42 extend from the pulleys 41 and are adapted to drive pulleys 43 that are suitably secured on a shaft 44. The shaft 44 is in turn coupled at 45 to a further shaft 46 that is resiliently coupled at 47 to the propeller shaft 35. It will readily be appreciated that the propeller shaft 35 may be actuated by the internal combustion engine 16 in many ways that will readily occur to those skilled in the art, and I have merely shown the particular method herein to illustrate the preferred arrangement that I have devised. It may be well at this point to state further that while I presently prefer to fabricate my machine as herein set forth, other methods of fabrication will readily occur to those skilled in the art, and will be revised and changed from time to time in accordance with changes in technology.

The ring of air developed by the blades 32 of the propeller 33 is adapted to move in the direction of the arrows 50 in Figs. 3 and 6 and it is the function of the guide fins 31 to prevent circular turbulence of the air within the air ring defined by the tunnel T and the cylindrical shell 30. As a result the flow of the ring of air will be relatively uniform.

In order to direct the ring of air radially towards the foliage that is being sprayed or dusted without imposing obstructions to its flow, I utilize the ring form deflector assembly that is well illustrated in the several drawings and more particularly in Figs. 6 and 7.

Referring now especially to Fig. 7, I show an assembly of three deflectors designated by reference numerals 51, 52, and 53. Preferably, the three deflectors 51, 52 and 53 are assembled as a single unit through the utilization of suitable reinforcing strut members 54 and 55, these strut members being welded or otherwise assembled to the deflectors, as those skilled in the art will appreciate. The deflectors are so formed that the particular group illustrated in Fig. 7 will occupy 90° of the circular ring of air generated in the tunnel, and therefore will act to deflect radially outwardly one-fourth of the air that issues from the tunnel. By having the deflectors so assembled in groups, it is seen that they may readily be applied to the machine in any relation that is desirable. Of course, it is possible to group the deflectors differently or to form one assembly of deflectors for the entire 360° of control.

Preferably, the surface 56 of the deflector 51 is formed as an extension of the cylindrical shell 30 and is probably best seen in Fig. 3. Similarly the surface 57 of the deflector 53 is shaped so as to form an extension of the inner surface of the member 26 forming part of the tunnel T. Each of the four deflector assemblies illustrated in Fig. 7 has its deflector 53 formed with a series of holes 58, and a series of bolts 59, best seen in Fig. 3, are then utilized to secure the deflector assemblies to the tunnel. For the particular purpose, a structural member 60 that is suitably secured to the outer casing 25 and the tunnel T is formed with openings for the passage of the bolts 59, all as will be quite apparent from the drawings.

The central deflector 52 located between the deflectors 51 and 53, is so formed as not to impede unduly the flow of the air, while assisting the other deflectors in directing the air outwardly and radially relatively to the tunnel. As a further feature of the invention, the several struts 54, as is best seen in Fig. 4, may be shaped so as to direct the ring of air and to impart some upward direction thereto. This is an additional function of the struts 54 that may frequently be of value, and the struts can be formed to direct the air in accordance with the particular type of control that may be necessary for the spraying of various crops.

In Figs. 3, 4, and 5 it will be noted that at the bottom of the machine there is a sheet metal plate 61 having leaves 62 and 63. It is the function of these leaves to receive the air that is directed radially downwardly along the lines of arrows 64 in Fig. 1, and to redirect that air upwardly and to each side of the machine. For the particular purpose, the leaves 62, 63 may take the form shown in dotted lines in Fig. 5 and thereby impart upward direction to the ring of air.

It frequently happens in the operation of the machine, and while the machine is moving through an orange grove or orchard, that a certain portion of the ring of air developed through the tunnel cannot be effectively utilized. Under such conditions it is highly desirable that the operator be able to shut off part of the flow of air, as well as the spraying or dusting material, and for the particular purpose I utilize a series of curved plates 65, there being four of the said plates occupying the 360° of the ring of air. Each of the plates 65 has secured thereto a pair of rollers 66 at one end and a second pair of rollers 67 at the opposite end, all as is best seen in Figs. 3 and 5.

Four tracks 68 are secured to the outer casing 25 by brackets 68*a* or other suitable means as is well illustrated in Fig. 5, and the several rollers 66 and 67 are adapted to move linearly on the said tracks and longitudinally relatively to the tunnel. Each of the tracks 68 has a series of flanges 69 relatively to which the rollers 66 and 67 may move, the said flanges 69 acting not only as bearings on which the rollers may rotate, but also as retaining means for the said rollers adapted to hold the several plates 65 in proper position.

Circular structural angular members 27*a* and 28*a* serve to hold together parts 27 and 28 of the tunnel T, and to these members I have secured a series of four brackets 70. Each bracket 70 mounts for rotation a roller 71 over which is applied a continuous cable 72. Each cable 72 is secured at 73 to a bracket 74 that is welded to each plate 65. As is best seen in Fig. 3, the several cables 72 pass to the front end of the machine through pipes 75 secured within the tank 12. Each of the cables then passes over a pulley 76 having an operating handle 77 and mounted for rotation on a shaft 78 relatively to a bracket 79 that is welded to the tank 12. It is now readily seen that by rotation of a pulley 76 by handle 77, a cable 72 will be moved so as to move with it the particular plate 65 to which it is secured at 73, 74. In order not to complicate the drawings, I do not show in Fig. 1 the pulleys 76, and for the same reason I do not show in Fig. 3, the control mechanism C.

It will readily be appreciated that when one of the plates 65 is moved from an inward position occupied by the uppermost plate 65 in Fig. 3 to the outer position occupied by the lowermost plate 65 in that same figure, a portion of the ring of air developed through the tunnel will not be able to move axially and radially thereof under the influence of the deflectors, but will first have to move circularly and then axially and radially under the influence of those deflectors whose action is not blocked by a plate 65. In this way the air flow may be very readily and simply controlled from the front end of the machine, as is most desirable.

I have previously alluded to the tubes 14 and nozzles 13 that make available to the ring of air the spraying fluid that is contained within the tank 12. Referring now more especially to Figs. 3 and 4, it will be noted that the tubes 14 are so bent that they conform to the shape of the deflectors 51 and 53, the right hand spray carrying tube 14 lying within the groove 53*a* of the deflector 50, so that it will be out of the path of the blast of air that moves along the surface 57. However, in accordance with the teachings of my earlier patents, this blast of air will accept the spraying material issuing from the several nozzles 13 and will move the spraying material towards the foliage. The left hand tube 14 of the several figures is positioned so as to lie but partially within the air stream and mainly to one side thereof. Its nozzles will feed spraying material into the blast of air, all as I have already indicated and as will be apparent to those who have studied my earlier patents.

It will now be readily appreciated that through my invention I contribute a spraying machine, or a machine capable of moving dust, in which a ring of air is developed with the components of that ring of air directed radially and outwardly with a minimum of loss. It will also be appreciated that the ring of air is fully controlled at all times and that its direction may be varied as may be required, depending on the type of foliage to be sprayed. I believe that those skilled in the art will fully appreciate the merits of my invention and the rather considerable contribution to the art.

I now claim:

1. In a machine of the class described, a tunnel, an air propeller having a central imperforate hub portion and a series of blades, means mounting said propeller for rotation in an axis longitudinal and substantially central of said tunnel for developing a flow of air longitudinally through said tunnel, a cylindrical shell substantially the same in diameter as the hub portion of said air propeller secured in said tunnel coaxially with said propeller and forming with said tunnel an air ring for the passage of the air blast generated by the blades of said propeller, and means for feeding an insecticide or the like positioned relatively to said air ring whereby the ring-like blast of air generated through said air ring will pick up the insecticide fed by said means and form it into a fine fog.

2. In a machine of the class described, a tunnel, an air propeller having a central imperforate hub portion and a series of blades, means mounting said propeller for rotation in an axis longitudinal and substantially central of said tunnel for developing a flow of air longitudinally through said tunnel, a cylindrical shell substantially the same in diameter as the hub portion of said air propeller secured in said tunnel coaxially with said propeller and forming with said tunnel an air ring for the passage of the air blast generated by the blades of said propeller, a ring deflector having a curved surface positioned at the end of said air ring for directing the ring of air substantially radially of said air ring toward foliage or the like, and means for feeding an insecticide or the like positioned relatively to said air ring whereby the ring-like blast of air generated through said air ring will pick up the insecticide fed by said means and form it into a fine fog.

3. In a machine of the class described, a tunnel, an air propeller having a central imperforate hub portion and a series of blades, means mounting said propeller for rotation in an axis longitudinal and substantially central of said tunnel for developing a flow of air longitudinally through said tunnel, a shell forming substantially a continuation of the hub portion of said air propeller mounted coaxially with said propeller and forming with said tunnel an air ring for the passage of the air blast generated by the blades of said propeller, air control vanes between said shell and tunnel for guiding the air blast so that its flow is axial of said tunnel, a ring deflector forming substantially a continuation of the exhaust end of said shell and curved radially outwardly to deflect the ring of air radially and outwardly of said air ring toward the foliage to be sprayed, and means for feeding an insecticide or the like positioned relatively to said air ring whereby the ring-like blast of air generated through said air ring will pick up the insecticide fed by said means and form it into a fine fog.

4. In a machine of the class described, a tunnel, an air propeller having a central imperforate hub portion and a series of blades, means mounting said propeller for rotation in an axis longitudinal and substantially central of said tunnel for developing a flow of air longitudinally through said tunnel, a cylindrical shell substantially the same in diameter as the hub portion of said air propeller secured in said tunnel coaxially with said propeller and forming with said tunnel an air ring for the passage of the air blast generated by the blades of said propeller, a ring deflector forming substantially a continuation of the exhaust end of said cylindrical shell and curved radially outwardly to deflect the ring of air radially and outwardly of said air ring toward the foliage to be sprayed, a complementary curved ring deflector secured at the end of the tunnel, and means for feeding an insecticide or the like positioned relatively to said air ring whereby the ring-like blast of air generated through said air ring will pick up the insecticide fed by said means and form it into a fine fog.

5. In a machine of the class described, a tunnel, an air propeller having a central imperforate hub portion and a series of blades, means mounting said propeller for rotation in an axis longitudinal and substantially central of said tunnel for developing a flow of air longitudinally through said tunnel, a cylindrical shell substantially the same in diameter as the hub portion of said air propeller secured in said tunnel coaxially with said propeller and forming with said tunnel an air ring for the passage of the air blast generated by the blades of said propeller, a ring deflector forming substantially a continuation of the exhaust end of said cylindrical shell and curved radially outwardly to deflect the ring of air radially and outwardly of said air ring toward the foliage to be sprayed, an auxiliary curved ring deflector positioned within the ring of air flowing from between said tunnel and cylindrical shell for assisting said first ring deflector in the deflection of said air, and means for feeding an insecticide or the like positioned relatively to said air ring whereby the ring-like blast of air generated through said air ring will pick up the insecticide fed by said means and form it into a fine fog.

6. In a machine of the class described, a tunnel, an air propeller having a central imperforate hub portion and a series of blades, means mounting said propeller for rotation in an axis longitudinal and substantially central of said tunnel for developing a flow of air longitudinally through said tunnel, a shell secured in said tunnel coaxially with said propeller, the outer surface of said shell forming substantially an extension of the hub of said propeller and defining with said tunnel an air ring whereby the air blast generated by the blades of said propeller will be in the form of a ring of air, and means for feeding an insecticide or the like positioned relatively to said air ring whereby the ring-like blast of air generated through said air ring will pick up the insecticide fed by said means and form it into a fine fog.

7. In a machine of the class described, a tunnel, an air propeller having a central imperforate hub portion and a series of blades, means mounting said propeller for rotation in an axis longitudinal and substantially central of said tunnel for developing a flow of air longitudinally through said tunnel, a shell secured in said tunnel coaxially with said propeller, the outer surface of said shell forming substantially an extension of the hub of said propeller and defining, with said tunnel an air ring for the passage of the air blast generated by the blades of said propeller, a deflector assembly positioned relatively to the shell and curved for directing the ring of air generated by said propeller blades and flowing between said shell and tunnel, and means for feeding an insecticide or the like positioned relatively to said air ring whereby the ring-like blast of air generated through said air ring will pick up the insecticide fed by said means and form it into a fine fog.

8. In a machine of the class described, a tunnel, an air propeller having a central hub portion and a series of blades, means mounting said propeller for rotation in an axis longitudinal and substantially central of said tunnel for developing a flow of air longitudinally through said tunnel, a shell secured in said tunnel coaxially with said propeller and forming with said tunnel an air ring for the passage of the air blast generated by the blades of said propeller, a deflector assembly positioned at the end of said shell and curved for directing the ring of air generated by said propeller blades and flowing between said shell and tunnel, means for feeding an insecticide or the like positioned relatively to said air ring whereby the ring-like blast of air generated through said air ring will pick up the insecticide fed by said means and form it into a fine fog, plates adapted to shield parts of the deflector assembly, and means mounting said plates for sliding movement on said tunnel to form extensions thereof between said deflector assembly and tunnel, said plates when forming extensions of said tunnel inhibiting the flow of air outwardly from that portion of the deflector assembly shielded thereby.

9. In a machine of the class described, a tunnel, an air propeller having a central hub portion and a series of blades, means mounting said propeller for rotation in an axis longitudinal and substantially central of said tunnel for developing a flow of air longitudinally through said tunnel, a shell secured in said tunnel coaxially with said propeller and forming with said tunnel an air ring for the passage of the air blast generated by the blades of said propeller, a deflector assembly secured at the end of the shell and tunnel at the exhaust end of said tunnel, said deflector assembly having curved deflector surfaces for directing radially and outwardly the ring of air generated by said propeller blades and flowing between said shell and tunnel, means for feeding an insecticide or the like positioned relatively to said air ring whereby the ring-like blast of air generated through said air ring will pick up the insecticide fed by said means and form it into a fine fog, and shielding members positioned to shield parts of the deflector assembly so that the flow of air outwardly from the shielded parts of said ring of air is inhibited.

10. In a machine of the class described, a wheeled chassis, a storage compartment for an insecticide or the like on said chassis, a tunnel at the end of said chassis, an air propeller having a series of blades, means mounting said propeller at said end of said chassis for rotation in an axis longitudinal and substantially central of said tunnel for developing a flow of air longitudinally of said tunnel toward the storage compartment, a space between said tunnel and said storage compartment, a deflector assembly in said space for directing the air flow radially outwardly toward foliage or the like, and means for feeding an insecticide or the like from said storage compartment for acceptance by said air flow.

11. In a machine of the class described, a wheeled chassis, a storage compartment for an insecticide or the like on said chassis, a tunnel at the end of said chassis, an air propeller having a central hub portion and a series of blades, means mounting said propeller for rotation in an axis longitudinal and substantially central of said tunnel for developing a flow of air longitudinally of said tunnel toward the storage compartment, a shell secured in said tunnel coaxially with said propeller and forming with said tunnel an air ring for the passage of the air blast generated by the blades of said propeller, a space between said tunnel and said storage compartment, a deflector assembly in said space for directing the flow of the said air ring radially outwardly toward foliage or the like, and means for feeding an insecticide or the like from said storage compartment for acceptance by said air ring.

12. In a machine of the class described, a wheeled chassis, a storage compartment for an insecticide or the like positioned on said chassis, a tunnel at the end of said chassis, an air propeller having a central imperforate hub portion and a series of blades, means mounting said propeller at said end of said chassis for rotation in an axis longitudinal and substantially central of said tunnel for developing a flow of air longitudinally of said tunnel toward the storage compartment, a shell secured in said tunnel coaxially with said propeller and forming with said tunnel an air ring for the passage of the air blast generated by the blades of said propeller, a space between said tunnel and said storage compartment, a ring deflector in said space forming substantially a continuation of the exhaust end of said cylindrical shell and curved radially outwardly to deflect the ring of air radially and outwardly of said air ring toward the foliage to be sprayed, and means for feeding an insecticide or the like from said storage compartment for acceptance by said air ring.

13. In a machine of the class described, an air propeller having a central imperforate hub portion having substantially no air blast generating function and a series of blades extending from said hub portion adapted to generate a ring-like blast of air, a confining surface about said propeller defining the outer periphery of said ring-like blast of air, a deflector assembly including a deflector forming substantially an extension of the outer periphery of said central hub portion whereby to maintain the ring-like form of the air blast generated by said series of blades and curved for directing radially of the propeller axis the ring of air generated by said propeller blades, means for feeding an insecticide or the like positioned relatively to said deflector system whereby the ring-like blast of air will pick up the insecticide fed by said means and form it into a fine fog, and additional air blast directing means carried by said deflector assembly for contact with a relatively small portion of the ring of air flowing towards an angular sector of said deflector assembly for imparting direction to said portion of the air blast.

14. In a machine of the class described, a tunnel, an air propeller having a central imperforate hub portion having no air blast generating function and a series of blades adapted to generate a ring-like blast of air, means mounting said air propeller for rotation on an axis longitudinal of said tunnel, deflector means forming substantially an extension of the outer periphery of said central hub portion whereby to maintain the ring-like form of the air blast generated by said series of blades and positioned and shaped relatively to said tunnel for deflecting the ring-like blast of air radially of said tunnel, and means for feeding insecticide to said ring-like blast of air to be carried thereby to foliage.

15. In a machine of the class described, an air propeller having a central imperforate hub portion having substantially no air blast generating function and a series of blades extending from said hub portion adapted to generate a ring-like blast of air, a confining surface about said propeller defining the outer periphery of said ring-like blast of air, a deflector for said ring-like blast of air forming substantially an extension of the outer periphery of said central hub portion whereby to maintain the ring-like form of the air blast generated by said series of blades by defining the inner periphery of said air blast, said deflector curving radially outwardly relatively to the axis of rotation of said propeller to deflect the ring-like air blast radially of the propeller axis, and means for feeding insecticide to said ring-like blast of air to be carried thereby to the foliage.

16. In a machine of the class described, a wheeled chassis, a storage compartment on said chassis, an engine compartment on said chassis, an air propeller, means mounting said air propeller for rotation on said chassis in an axis parallel to the longitudinal axis of said chassis, means whereby said engine drives said propeller, a generally cylindroidal outer peripheral surface for said machine extending for its length and outlining said machine as a tube in effect of curved cross section, said outer peripheral surface being interrupted by an open area between the ends thereof extending generally circumferentially of said surface and through which the air blast developed by said propeller flows radially, and means for feeding insecticide from said storage compartment toward said open area for acceptance by said air blast.

17. In a machine of the class described, a tunnel, an air propeller having a central imperforate hub portion and a series of blades, means mounting said propeller for rotation in an axis longitudinal and substantially central of said tunnel for developing a flow of air longitudinally through said tunnel, a shell secured in said tunnel coaxially with said propeller, the outer surface of said shell forming substantially an extension of the hub of said propeller and defining with said tunnel an air ring for the passage of the air blast generated by the blades of said propeller, a deflector assembly positioned relatively to the shell and curved for directing the ring of air generated by said propeller blades and flowing between said shell and tunnel, and shielding means for covering a part of the outer periphery of said deflector system whereby that portion of the ring of air normally moving through said part of the deflector system is deflected for flow outwardly through the open part of said deflector system.

18. In a machine of the class described, a wheeled chassis, a storage compartment on said chassis, an engine compartment on said chassis, an air propeller, means mounting said air propeller for rotation on said chassis in an axis parallel to the longitudinal axis of said chassis, means whereby said engine drives said propeller, a generally cylindroidal outer peripheral surface for said machine extending for its length and outlining said machine as a tube in effect of curved cross section, said outer peripheral surface being interrupted by an open area between the ends thereof extending generally circumferentially of said surface and through which the air blast developed by said propeller flows radially, shielding means for covering a part of said open area whereby to prevent the flow of air through said covered portion, and means for feeding insecticide from said storage compartment toward said open area for acceptance by said air blast.

GEORGE W. DAUGHERTY.

REFERENCES CITED

The following references are of record in the file of this patent:

UNITED STATES PATENTS

| Number | Name | Date |
|---|---|---|
| 470,693 | Mertz | Mar. 15, 1892 |
| 511,781 | Leggett | Jan. 2, 1894 |
| 668,028 | Ulbrich | Feb. 12, 1901 |
| 750,716 | Smith | Jan. 26, 1904 |
| 908,962 | Cramer | Jan. 5, 1909 |
| 1,862,396 | Gray et al. | June 7, 1932 |
| 2,027,687 | Fuller | Jan. 14, 1936 |
| 2,159,189 | Wais | May 23, 1939 |
| 2,258,731 | Blumenthal | Oct. 14, 1941 |
| 2,358,318 | Daugherty | Sept. 19, 1944 |
| 2,391,512 | Ponomaroff | Dec. 23, 1945 |

FOREIGN PATENTS

| Number | Country | Date |
|---|---|---|
| 450,196 | Great Britain | July 13, 1936 |